(12) United States Patent
Shen (10) Patent No.: US 12,403,863 B1
(45) Date of Patent: Sep. 2, 2025

(54) VEHICLE DOOR ACCESS CONTROL METHOD

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 20 days.

(21) Appl. No.: 18/653,924

(22) Filed: May 2, 2024

(30) Foreign Application Priority Data

Apr. 18, 2024 (TW) ................. 113114458

(51) Int. Cl.
  *B60R 25/25* (2013.01)
  *B60R 25/20* (2013.01)
  *B60R 25/24* (2013.01)
  *B60R 25/30* (2013.01)

(52) U.S. Cl.
  CPC ......... *B60R 25/25* (2013.01); *B60R 25/2072* (2013.01); *B60R 25/24* (2013.01); *B60R 25/305* (2013.01)

(58) Field of Classification Search
  None
  See application file for complete search history.

(56) References Cited

U.S. PATENT DOCUMENTS

| | | | |
|---|---|---|---|
| 1,643,932 A | 9/1927 | Teich | |
| 1,687,009 A | 10/1928 | Drexler et al. | |
| 2,820,241 A | 1/1958 | Schlage | |
| 4,102,005 A | 7/1978 | Schnarr et al. | |
| 4,107,877 A | 8/1978 | Lee | |
| 4,267,619 A | 5/1981 | Suska | |
| 4,348,835 A | 9/1982 | Jones et al. | |
| 4,419,787 A | 12/1983 | Lieberman | |
| 4,501,090 A | 2/1985 | Yoshida et al. | |
| 4,628,636 A | 12/1986 | Folger | |
| 4,867,496 A | 9/1989 | Thomas | |
| 5,040,331 A | 8/1991 | Merendino et al. | |
| 5,782,509 A | 7/1998 | Uyeda | |
| 6,177,771 B1 | 1/2001 | Kinzer et al. | |
| 6,454,324 B1 | 9/2002 | Lewis et al. | |
| 6,553,717 B2 | 4/2003 | St. John et al. | |
| 6,622,535 B2 | 9/2003 | Chiang et al. | |
| 6,634,140 B1 | 10/2003 | Sellman | |
| 6,732,557 B1 | 5/2004 | Zehrung | |
| 6,745,603 B1 | 6/2004 | Shaw | |
| 6,786,006 B2 | 9/2004 | Kowalczyk et al. | |
| 6,891,479 B1 | 5/2005 | Eccleston | |
| 6,978,646 B2 | 12/2005 | Raatikainen | |
| 7,051,403 B2 | 5/2006 | Homberg | |
| 7,061,197 B1 | 6/2006 | Mullet et al. | |
| 7,068,179 B2 | 6/2006 | Snell et al. | |

(Continued)

FOREIGN PATENT DOCUMENTS

| AU | 2014339759 B2 | 5/2018 |
|---|---|---|
| DE | 102016202225 A1 | 8/2017 |

(Continued)

*Primary Examiner* — K. Wong
(74) *Attorney, Agent, or Firm* — Ying-Ting Chen; Law Office of Michael Chen (57) ABSTRACT

A vehicle door access control method comprises using a smart mobile device to obtain management authority of an external door access device. Then, the smart mobile device is used to authorize the unlocking authority to a vehicle host, such that the external door access device permits use of the smart mobile device or the vehicle to proceed with unlocking or opening operation.

6 Claims, 4 Drawing Sheets

(56) References Cited

U.S. PATENT DOCUMENTS

| | | |
|---|---|---|
| 7,143,547 B2 | 12/2006 | Liles, Jr. |
| 7,234,201 B2 | 6/2007 | Brown et al. |
| 7,240,524 B1 | 7/2007 | White et al. |
| 7,282,883 B2 | 10/2007 | Mullet et al. |
| 7,296,380 B2 | 11/2007 | Backman |
| 7,316,096 B2 | 1/2008 | Houser et al. |
| 7,418,800 B1 | 9/2008 | Sellman |
| 7,484,333 B2 | 2/2009 | Houser et al. |
| 7,555,867 B2 | 7/2009 | Liles, Jr. |
| 7,717,155 B2 | 5/2010 | Mullet |
| 7,774,984 B2 | 8/2010 | Hsu |
| 7,966,771 B2 | 6/2011 | Bienek |
| 8,109,038 B2 | 2/2012 | Houser et al. |
| 8,169,169 B2 | 5/2012 | Hass et al. |
| 8,201,858 B1 | 6/2012 | Moon et al. |
| 8,225,458 B1 | 7/2012 | Hoffberg |
| 8,248,005 B2 | 8/2012 | Romer |
| 8,359,790 B2 | 1/2013 | Shin |
| 8,382,008 B1 | 2/2013 | Ricciardi et al. |
| 8,390,219 B2 | 3/2013 | Houser |
| 8,393,054 B2 | 3/2013 | Bienek |
| 8,407,937 B2 | 4/2013 | Houser |
| 8,415,902 B2 | 4/2013 | Burris et al. |
| 8,434,268 B2 | 5/2013 | Nixon |
| 8,499,495 B2 | 8/2013 | Houser et al. |
| 8,523,248 B2 | 9/2013 | Tien |
| 8,540,290 B2 | 9/2013 | Chen |
| 8,547,046 B2 | 10/2013 | Burris et al. |
| 8,601,744 B2 | 12/2013 | Wildforster et al. |
| 8,695,277 B2 | 4/2014 | Romer et al. |
| 8,773,237 B2 | 7/2014 | Burris et al. |
| 8,826,598 B2 | 9/2014 | Ranaudo et al. |
| 8,875,344 B2 | 11/2014 | Salutzki et al. |
| 8,904,710 B2 | 12/2014 | Romer et al. |
| 8,963,683 B2 | 2/2015 | Romer |
| 9,003,630 B2 | 4/2015 | Hufen |
| 9,045,927 B1 | 6/2015 | Hoffberg |
| 9,097,051 B2 | 8/2015 | Hellwig |
| 9,115,526 B2 | 8/2015 | Houser et al. |
| 9,121,217 B1 | 9/2015 | Hoffberg |
| 9,163,446 B2 | 10/2015 | Houser et al. |
| 9,181,744 B2 | 11/2015 | Salutzki et al. |
| 9,187,942 B2 | 11/2015 | Wildforster |
| 9,297,194 B2 | 3/2016 | Bienek et al. |
| 9,506,284 B2 | 11/2016 | Braverman et al. |
| 9,514,583 B2 | 12/2016 | Zasowski et al. |
| 9,631,412 B2 | 4/2017 | Hellwig et al. |
| 9,683,378 B2 | 6/2017 | Houser et al. |
| 9,695,620 B2 | 7/2017 | Zasowski et al. |
| 9,830,932 B1 | 11/2017 | Gunderson et al. |
| 9,869,117 B2 | 1/2018 | Houser et al. |
| 9,886,831 B1 | 2/2018 | Svoboda et al. |
| 9,995,076 B1 | 6/2018 | Hoffberg |
| 10,006,236 B2 | 6/2018 | Hellwig et al. |
| 10,024,094 B2 | 7/2018 | Bell et al. |
| 10,030,425 B2 | 7/2018 | Zasowski et al. |
| 10,030,426 B2 | 7/2018 | Langenberg |
| 10,077,591 B2 | 9/2018 | Hass |
| 10,180,023 B2 | 1/2019 | Zasowski et al. |
| 10,208,520 B2 | 2/2019 | Long et al. |
| 10,236,801 B2 | 3/2019 | Dye et al. |
| 10,253,540 B2 | 4/2019 | Bell et al. |
| 10,273,736 B2 | 4/2019 | Hucker |
| 10,280,670 B2 | 5/2019 | Roberts |
| 10,280,678 B1 | 5/2019 | Rendon, Jr. et al. |
| 10,304,272 B2 | 5/2019 | Kvinge et al. |
| 10,316,568 B2 | 6/2019 | Langenberg et al. |
| 10,344,502 B2 | 7/2019 | McKibben et al. |
| 10,415,301 B2 | 9/2019 | Kuan |
| 10,458,151 B1 | 10/2019 | Shen |
| 10,472,873 B2 | 11/2019 | Ladha et al. |
| 10,480,238 B1 | 11/2019 | La Force |
| 10,559,151 B2 | 2/2020 | Kvinge et al. |
| 10,648,198 B1 | 5/2020 | Shen |
| 10,648,208 B2 | 5/2020 | Eickhoff |
| 10,704,310 B1 | 7/2020 | Barbon et al. |
| 10,704,313 B2 | 7/2020 | Houser et al. |
| 10,724,288 B2 | 7/2020 | Baumgarte |
| 10,844,644 B2 | 11/2020 | Langenberg et al. |
| 10,968,677 B2 | 4/2021 | Hass |
| 11,002,055 B2 | 5/2021 | Eickhoff et al. |
| 11,124,997 B2 | 9/2021 | Eickhoff |
| 11,187,022 B1 | 11/2021 | Hoffberg |
| 11,250,655 B2 | 2/2022 | Shen |
| 11,312,207 B1 | 4/2022 | Sanders et al. |
| 11,417,200 B2 | 8/2022 | Hass et al. |
| 11,542,727 B2 | 1/2023 | Hsu |
| 11,544,979 B1 | 1/2023 | Shen |
| 11,606,681 B2 | 3/2023 | Shen |
| 11,629,527 B2 | 4/2023 | Hsu |
| 11,629,544 B1 | 4/2023 | Tien |
| 11,631,292 B2 | 4/2023 | Shen |
| 11,661,782 B2 | 5/2023 | Eickhoff et al. |
| 11,727,770 B2 | 8/2023 | Shen et al. |
| 11,753,848 B2 | 9/2023 | Tien |
| 11,756,355 B2 | 9/2023 | Shen |
| 11,795,751 B2 | 10/2023 | Tien |
| 11,798,330 B2 * | 10/2023 | Shen ............... G07C 9/00817 |
| 11,814,876 B2 | 11/2023 | Huang |
| 11,828,097 B1 | 11/2023 | Tien |
| 2002/0026750 A1 | 3/2002 | St. John et al. |
| 2002/0178655 A1 | 12/2002 | Pedemonte |
| 2003/0127869 A1 | 7/2003 | Herron et al. |
| 2003/0187805 A1 | 10/2003 | Shen |
| 2003/0204935 A1 | 11/2003 | Kim |
| 2005/0154612 A1 | 7/2005 | Smith et al. |
| 2006/0244271 A1 | 11/2006 | Hass |
| 2006/0261675 A1 | 11/2006 | Unno |
| 2007/0022664 A1 | 2/2007 | Mahonen et al. |
| 2007/0114800 A1 | 5/2007 | Kuo |
| 2007/0256362 A1 | 11/2007 | Hansen |
| 2007/0268132 A1 | 11/2007 | Milo |
| 2008/0011030 A1 | 1/2008 | Ferreira Sanchez et al. |
| 2009/0265992 A1 | 10/2009 | Hass et al. |
| 2010/0107495 A1 | 5/2010 | Bourgeois et al. |
| 2010/0315229 A1 | 12/2010 | Shin |
| 2011/0094160 A1 | 4/2011 | Houser |
| 2011/0252597 A1 | 10/2011 | Burris et al. |
| 2011/0302841 A1 | 12/2011 | Ye et al. |
| 2012/0029701 A1 | 2/2012 | Houser |
| 2012/0159852 A1 | 6/2012 | Houser et al. |
| 2012/0190325 A1 | 7/2012 | Abu-Hakima et al. |
| 2013/0009785 A1 | 1/2013 | Finn et al. |
| 2013/0216438 A1 | 8/2013 | Hill et al. |
| 2013/0308778 A1 | 11/2013 | Fosmark et al. |
| 2013/0346333 A1 | 12/2013 | Hassler et al. |
| 2014/0026627 A1 | 1/2014 | Rai et al. |
| 2014/0165329 A1 | 6/2014 | Wildförster |
| 2014/0255252 A1 | 9/2014 | Stratman et al. |
| 2014/0282934 A1 | 9/2014 | Miasnik et al. |
| 2014/0325911 A1 | 11/2014 | Hass |
| 2015/0070166 A1 | 3/2015 | Boyden et al. |
| 2015/0113876 A1 | 4/2015 | Burris et al. |
| 2015/0194033 A1 | 7/2015 | Esposito et al. |
| 2015/0211278 A1 | 7/2015 | Moyer et al. |
| 2015/0262438 A1 | 9/2015 | Zasowski et al. |
| 2015/0339913 A1 | 11/2015 | Lyman et al. |
| 2016/0220716 A1 | 8/2016 | Childress et al. |
| 2016/0258189 A1 | 9/2016 | Frolov |
| 2016/0312514 A1 | 10/2016 | Leonard et al. |
| 2016/0348415 A1 | 12/2016 | Baumgarte |
| 2016/0368455 A1 | 12/2016 | Kim et al. |
| 2017/0275912 A1 | 9/2017 | Murphy |
| 2017/0275921 A1 | 9/2017 | Murphy et al. |
| 2017/0306668 A1 | 10/2017 | Li et al. |
| 2017/0328100 A1 | 11/2017 | Eickhoff |
| 2018/0223577 A1 | 8/2018 | Hucker |
| 2018/0334841 A1 | 11/2018 | Langenberg et al. |
| 2018/0334845 A1 | 11/2018 | Hass |
| 2019/0043289 A1 | 2/2019 | Cahill |
| 2019/0043296 A1 | 2/2019 | Baumgarte et al. |
| 2019/0145138 A1 | 5/2019 | Eickhoff |
| 2019/0153764 A1 | 5/2019 | Baumgarte |
| 2019/0203503 A1 | 7/2019 | Chang |

(56) References Cited

U.S. PATENT DOCUMENTS

| | | | |
|---|---|---|---|
| 2019/0264486 A1 | 8/2019 | Toloday et al. |
| 2019/0319557 A1 | 10/2019 | Dye et al. |
| 2019/0338576 A1 | 11/2019 | Wang |
| 2019/0345738 A1 | 11/2019 | McKibben et al. |
| 2019/0376316 A1 | 12/2019 | Hsu |
| 2019/0376317 A1 | 12/2019 | Hsu |
| 2019/0383080 A1 | 12/2019 | Barbon et al. |
| 2020/0037142 A1 | 1/2020 | Lofton |
| 2020/0190885 A1 | 6/2020 | Coleman |
| 2020/0211362 A1 | 7/2020 | Shen |
| 2020/0256108 A1 | 8/2020 | Shetty et al. |
| 2020/0327758 A1 | 10/2020 | Ma et al. |
| 2020/0372743 A1 | 11/2020 | Miller et al. |
| 2021/0011443 A1 | 1/2021 | Mcnamara et al. |
| 2021/0012598 A1 | 1/2021 | Giebat et al. |
| 2021/0023248 A1 | 1/2021 | Townsend et al. |
| 2021/0056791 A1 | 2/2021 | Shen |
| 2021/0123287 A1 | 4/2021 | Miller et al. |
| 2021/0134096 A1 | 5/2021 | Pukari |
| 2021/0192876 A1 | 6/2021 | Tikkanen et al. |
| 2021/0217260 A1 | 7/2021 | Chen |
| 2021/0252179 A1 | 8/2021 | Grinstead et al. |
| 2021/0308311 A1 | 10/2021 | Stewart et al. |
| 2022/0148393 A1 | 5/2022 | Shen et al. |
| 2022/0307316 A1 | 9/2022 | Soderqvist |
| 2023/0104006 A1 | 4/2023 | Tien |
| 2023/0133080 A1 | 5/2023 | Tien |
| 2023/0374820 A1 | 11/2023 | Huang |

FOREIGN PATENT DOCUMENTS

| | | |
|---|---|---|
| DE | 102017209467 A1 | 12/2018 |
| EP | 0107151 A1 | 5/1984 |
| EP | 1788169 A1 | 5/2007 |
| EP | 2933415 A1 | 10/2015 |
| EP | 3550528 A1 | 9/2019 |
| EP | 3805490 A1 | 4/2021 |
| GB | 2572027 A | 9/2019 |
| KR | 20210019168 A | 2/2021 |
| KR | 20210033154 A | 3/2021 |
| WO | 8800633 A1 | 1/1988 |
| WO | 2021007588 A1 | 1/2021 |
| WO | 2021050616 A1 | 3/2021 |
| WO | 2021214134 A1 | 10/2021 |
| WO | 2022063950 A1 | 3/2022 |
| WO | 2022063952 A1 | 3/2022 |
| WO | 2023036744 A1 | 3/2023 |

* cited by examiner

VEHICLE DOOR ACCESS CONTROL METHOD

BACKGROUND OF THE INVENTION

The present invention relates to a door access control method and, more particularly, to a method for unlocking a vehicle door access system exterior to a vehicle and controlled by a vehicle host.

A house with a garage is generally equipped with an electric door to control access, such as permitting or not permitting entrance of persons and cars. A building with an underground parking lot is generally equipped with an electric gate to control access, such as permitting or not permitting entrance of cars. A typical approach to control access is using a remote control to control opening or closing of the electric door or the electric gate. However, the user cannot open the electric door or the electric gate when the remote control is lost, and a person picking up the remote control can open the electric door or the electric gate.

BRIEF SUMMARY OF THE INVENTION

The present invention provides a vehicle door access control method comprising:
  pairing a smart mobile device with an external door access device to grant unlocking authority of the external door access device to the smart mobile device and to permit the smart mobile device to authorize the unlocking authority to another device;
  granting an operating authority of a vehicle to a vehicle key;
  registering a vehicle key information of the vehicle key into the smart mobile device;
  connecting the smart mobile device with a vehicle host;
  using the vehicle host to identify whether the vehicle key information stored in the smart mobile device is correct, wherein when the vehicle key information stored in the smart mobile device is identified as being incorrect, pairing of the vehicle host and the smart mobile device fails;
  using a vehicle end biological feature pick-up device of the vehicle to pick up a vehicle end authorization biological feature of a to-be-authorized person in the vehicle when the vehicle key information is identified as being correct, and using the vehicle end authentication biological feature to cooperate with the smart mobile device to create an unlocking information associated with the unlocking authority of the external door access device, and the unlocking information is stored in the vehicle host;
  picking up a to-be-compared vehicle end biological feature of a person in the vehicle through the vehicle end biological feature pick-up device;
  comparing the to-be-compared vehicle end biological feature with the vehicle end authentication biological feature of the unlocking information, wherein when the to-be-compared vehicle end biological feature matches with the vehicle end authentication biological feature, the vehicle transmit an unlocking command, and wherein the vehicle does not transmit the unlocking command when the to-be-compared vehicle end biological feature does not match with the vehicle end authentication biological feature; and
  using the external door access device to identify the unlocking command from the vehicle, wherein when the unlocking command is identified as being incorrect, the external door access device remains locked or is not opened, and wherein when the unlocking command is identified as being correct, the external door access device is unlocked or opened.

The driver of the vehicle can directly unlock or open the external door access device (such as unlocking an electronic door lock or opening an electric rolling door) outside the vehicle through the vehicle host. When the user intends to drive the vehicle through the door access control, it is not necessary to find a key, a remote control, or a smart mobile device for controlling the external door access device, providing enhanced convenience.

In an example, the vehicle end biological feature pick-up device is a camera, and wherein the biological feature is a facial feature of a person on a driver's seat.

In an example, wherein pairing the smart mobile device with the external door access device includes:
  operating the external door access device to enter a setting mode, wherein when connection between the smart mobile device and the external door access device is unsuccessful, the external door access device ends the setting mode, and wherein the smart mobile device obtains a hardware identification information of the external door access device when the smart mobile device is successfully connected with the external door access device; and
  using the smart mobile device to pick up a mobile end authentication biological feature, wherein when picking of the mobile end authentication biological feature is successful, the smart mobile device uses the hardware identification information and the mobile end authentication biological feature to create a management information, such that the smart mobile device is granted with management authority of the external door access device, the smart mobile device is permitted to authorize the unlocking authority of the external door access device to the another device, and the vehicle host obtains the hardware identification information and the mobile end authentication biological feature from the smart mobile device and encrypts the hardware identification information and the mobile end authentication biological feature as the unlocking information, and wherein when picking of the mobile end authentication biological feature is not successful, the smart mobile device does not create the management information.

In an example, the vehicle door access control method further comprises:
  re-identifying the vehicle key when using the vehicle key to obtain the operating authority of the vehicle and before using the vehicle end biological feature pick-up device to pick up the to-be-compared vehicle end biological feature, wherein when the vehicle key is re-identified by the vehicle host as being correct, the vehicle end biological feature pick-up device picks up the to-be-compared mobile end biological feature, and wherein when the vehicle key is re-identified by the vehicle host as being incorrect, the vehicle end biological feature pick-up device does not pick up the to-be-compared mobile end biological feature; and
  re-identifying the smart mobile device when using the smart mobile device to obtain the operating authority of the vehicle and before using the vehicle end biological feature pick-up device to pick up the to-be-compared vehicle end biological feature, wherein when the vehicle host reads the vehicle key information from the smart mobile device and identifies the vehicle key information as being correct, the vehicle end biological feature pick-up device picks up the to-be-compared mobile end biological feature, and wherein when the vehicle key information in the smart mobile device is re-identified by the vehicle host as being incorrect, the vehicle end biological feature pick-up device does not pick up the to-be-compared mobile end biological feature.

When the vehicle key is used to obtain the operating authority of the vehicle and the vehicle host is used to execute the vehicle end door access application, the vehicle will confirm again whether the vehicle key is correct. The to-be-compared vehicle end biological feature of the driver will be picked up only when the vehicle key is identified as being correct. This enhances the safety of executing unlocking or opening of the external door access device through operation of the vehicle host.

In an example, the vehicle door access control method further comprises:
  using the smart mobile device to pick up a to-be-compared mobile end biological feature of a user; and
  comparing the to-be-compared mobile end biological feature with the mobile end authentication biological feature of the management information,
  wherein the smart mobile device does not transmit another unlocking command when the to-be-compared mobile end biological feature does not match with the mobile end authentication biological feature,
  wherein the smart mobile device transmits the another unlocking command when the to-be-compared mobile end biological feature matches with the mobile end authentication biological feature, wherein when the exterior door access device identifies the another unlocking command from the smart mobile device as being correct, the external door access device is unlocked or opened, and wherein when the exterior door access device identifies the another unlocking command from the smart mobile device as being incorrect, the external door access device remains locked or is not opened.

When the smart mobile device is used to obtain the operating authority of the vehicle and the vehicle host is used to execute the vehicle end door access application, the vehicle will confirm again whether the smart mobile device has been paired. The to-be-compared vehicle end biological feature of the driver will be picked up only when the smart mobile device is identified as having been paired. This enhances the safety of executing unlocking or opening of the external door access device through operation of the vehicle host.

In an example, the smart mobile device is used to input a to-be-compared mobile end biological feature before the smart mobile device is connected with the vehicle host. When the to-be-compared mobile end biological feature matches with the mobile end authentication biological feature of the management information, the smart mobile device is connected with the vehicle host. When the to-be-compared mobile end biological feature does not match with the mobile end authentication biological feature of the management information, the smart mobile device is not connected with the vehicle host.

The unlocking information created by the vehicle requires verification of whether the vehicle key information stored in the smart mobile device is correct. Even if the smart mobile device is lost, a person picking up the smart mobile device is difficult to use the smart mobile device to create the unlocking information of the vehicle, providing enhanced safety.

The present invention will become clearer in light of the following detailed description of illustrative embodiments of this invention described in connection with the drawings.

DETAILED DESCRIPTION OF THE INVENTION

Figure 1:
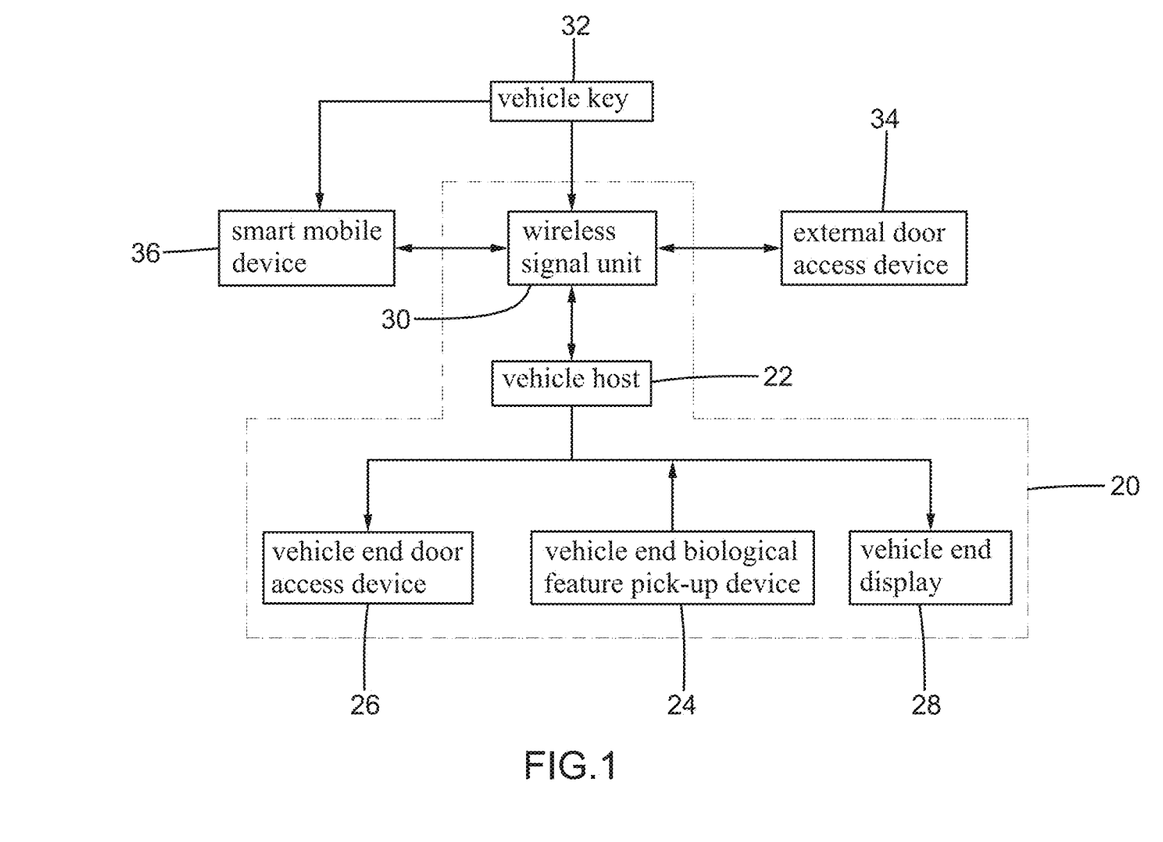
FIG. 1 is a diagrammatic diagram illustrating related hardware for executing a vehicle door access control method according to the present invention.

The present invention relates to a vehicle door access control method for unlocking an external door access device exterior to a vehicle through use of a vehicle host and hardware associated with the vehicle host. With reference to FIG. 1, the vehicle 20 includes a vehicle host 22 installed in an interior space of the vehicle 20 and a vehicle end display 28 electrically connected to the vehicle host 22. The vehicle end display 28 is used to display an interface of an operating system used by the vehicle host 22. The operating system may be a program configured to control, execute, and integrate software and hardware, such as Tesla Software, FORD SYNC, or Android operating system. The vehicle end display 28 may be but not limited to a known touch control screen. The vehicle host 22 is used to run the operating system and is electrically connected to each part of the vehicle 20, such as a camera, an electronic control unit, an audio system, etc. mounted in the vehicle 20.

The vehicle 20 further includes a vehicle end biological feature pick-up device 24, a vehicle end door access device 26, and a wireless signal unit 30. The vehicle end biological feature pick-up device 24 is electrically connected to the vehicle host 22 and may be but not limited to at least one of a camera, a fingerprint pick-up device, an iris feature pick-up device, and a vein feature pick-up device. The vehicle end door access device 26 is electrically connected to the vehicle host 22 to control access to the vehicle 20. The vehicle end door access device 26 may be but not limited to include plural doors and locks for locking the doors. Thus, it can be appreciated that when the vehicle 20 is locked, a person outside of the vehicle 20 is unable to open the doors of the vehicle 20. The person outside of the vehicle 20 can enter and drive the vehicle 20 only when the vehicle 20 is unlocked to permit opening of the doors.

The wireless signal unit 30 is electrically connected to the vehicle host 20 and may but not limited to use techniques using at least one of Wi-Fi, Global System for Mobile Communications (GSM), Bluetooth, radio frequency identification (RFID), and ultrahigh frequency (UHF).

The vehicle 20 can be locked or unlocked through a vehicle key 32. When the vehicle key 32 sends out a signal to the vehicle 20 and the vehicle 20 identifies the signal from the vehicle key 32 is correct, the vehicle end door access device 26 is unlocked, such that a person may open a door of the vehicle 2 to start the engine for driving or permit operations of other functions of the vehicle 20. It is noted that the vehicle key 32 is not a metal key. Instead, the vehicle key 32 is an electronic key with wireless transmission function, such as a remote control key, chip key (using such as UHF or active RFID), passive RFID key (a key card).

The vehicle door access control method according to the present invention uses a smart mobile device 36 to cooperate with the vehicle host 22 and the vehicle key 32 to unlock an external door access device 34 installed outside of the vehicle 20. The smart mobile device 36 may be but not limited to Apple's mobile phone of iPhone 15 series, Samsung's mobile phone of S24 series, or a smart mobile device produced by other companies. The external door access device 34 is a door access device disposed outside of the vehicle 20 without any physical connection with the vehicle 20, and the external door access device 34 can be operated only when in an unlocked state. The external door access device 34 may be but not limited to an electric rolling door, an electric gate, or an electronic door lock. In the following description, the external door access device 34 is in the form of an electric rolling door which can but not limited to match with a remote control (an electronic key) for controlling opening and closing.

Figure 2:
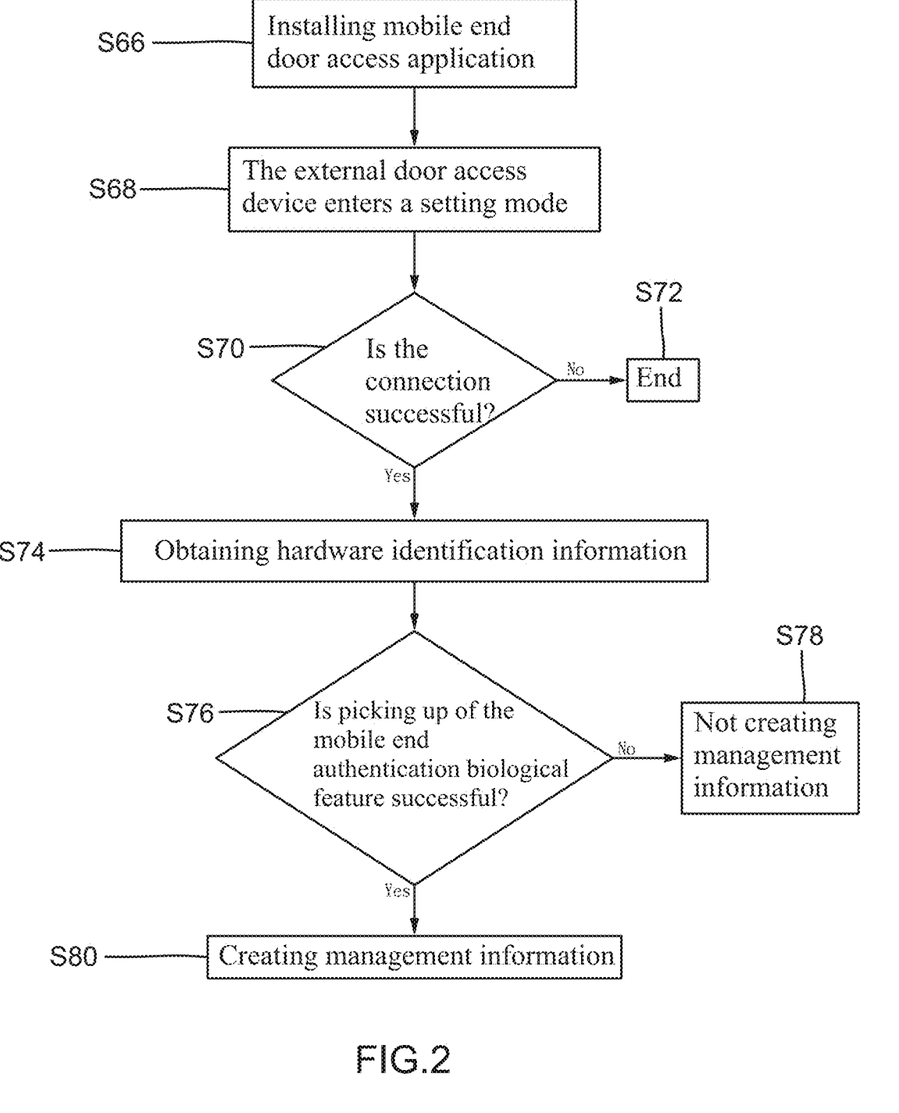
FIG. 2 is a flowchart illustrating a portion of an example of the vehicle door access control method according to the present invention.

With reference to FIG. 2, the smart mobile device 36 is firstly paired with the external door access device 34, such that the smart mobile device 36 obtains the management authority of the external door access device 34. The management authority granted to the smart mobile device 36 includes unlocking authority of the external door access device 34 as well as authorization of the unlocking authority of the external door access device 34 to another device (such as the vehicle host 22 and other smart mobile devices).

To connect with the external door access device 34, a mobile end door access application (APP) is firstly installed on the smart mobile device 36 (step S66). The smart mobile device 36 is connected with the external door access device 34 through execution of the mobile end door access application. When the smart mobile device 36 is running the mobile end door access application, an interface of the mobile end door access application will be shown on a touch screen of the smart mobile device 36 and can be used to guide the smart mobile device 36 to obtain the management authority of the external door access device 34.

After the mobile end door access application is executed by the smart mobile device 36, the external door access device 34 is operated to enter a setting mode (step S68). As an example, the external door access device 34 may include a hardware having a button which can be pressed (such as for 3 seconds) to set the external door access device 34 to the setting mode. For example, a button is mounted in a garage and adjacent to an electric rolling door. The button is located in a housing which can be opened from inside the garage (the housing cannot be opened from outside the garage), and the button can be pressed to set the electric rolling door to a setting mode. Since the button is located inside the garage, a person outside of the garage is unable to access the button and, thus, cannot set the electric rolling door (the external door access device 34) to the setting mode.

After the external door access device 34 enters the setting mode, the smart mobile device 36 can be connected with the external door access device 34 through a wireless technique (step S70), such as Bluetooth. Specifically, the interface of the mobile end door access application guides a person to operate on a screen (such as a touch screen) of the smart mobile device 36 to create connection with the external door access device 34 in the setting mode. Furthermore, in a case that the smart mobile device 36 is not connected with the external door access device 34 within a preset period of time (such as 60 seconds), the mobile end door access application of the smart mobile device 36 cannot obtain the management authority of the external door access device 34, and the external door access device 34 ends the setting mode (step S72).

When a person creates the connection between the smart mobile device 36 and the external door access device 34 under the guidance of the mobile end door access application, the external door access device 34 sends a hardware identification information to the smart mobile device 36, or the smart mobile device 36 reads the hardware identification information of the external door access device 34 (step S74). It is noted that every external door access device 34 has a unique hardware identification information, such that the smart mobile device 36 and the external door access device 34 can identity control commands or signals associated with the external door access device 34 through identification of the hardware identification information. For example, when the external door access device 34 receives an unlocking command containing a hardware identification information not the same as the hardware identification information built in the external door access device 34, the external door access device 34 will not execute the unlocking command.

After the smart mobile device 36 obtains the hardware identification information of the external door access device 34 connected thereto, the mobile end door access application guides a person (a to-be-authorized person) to use the smart mobile device 36 to pick up a mobile end authentication biological feature (step S76). For example, the mobile end door access application guides the person to use a camera of the smart mobile device 36 to pick up a facial feature of the person as the mobile end authentication biological feature.

When the mobile end door access application does not obtain the mobile end authentication biological feature, the mobile end door access application will not create management information associated with the exterior door access device 34 (step S78). On the other hand, when the mobile end door access application obtains the mobile end authentication biological feature, the mobile end door access application uses the mobile end authentication biological feature and the hardware identification information of the connected external door access device 34 to create a management information (step S80). It is noted that the management information may be but not limited to a file containing the hardware identification information and the mobile end authentication biological feature which are encrypted together as the file and may but not limited to be stored in the smart mobile device 36. Namely, the mobile end authentication biological feature and the hardware identification information are stored in the smart mobile device 36.

Figure 3:
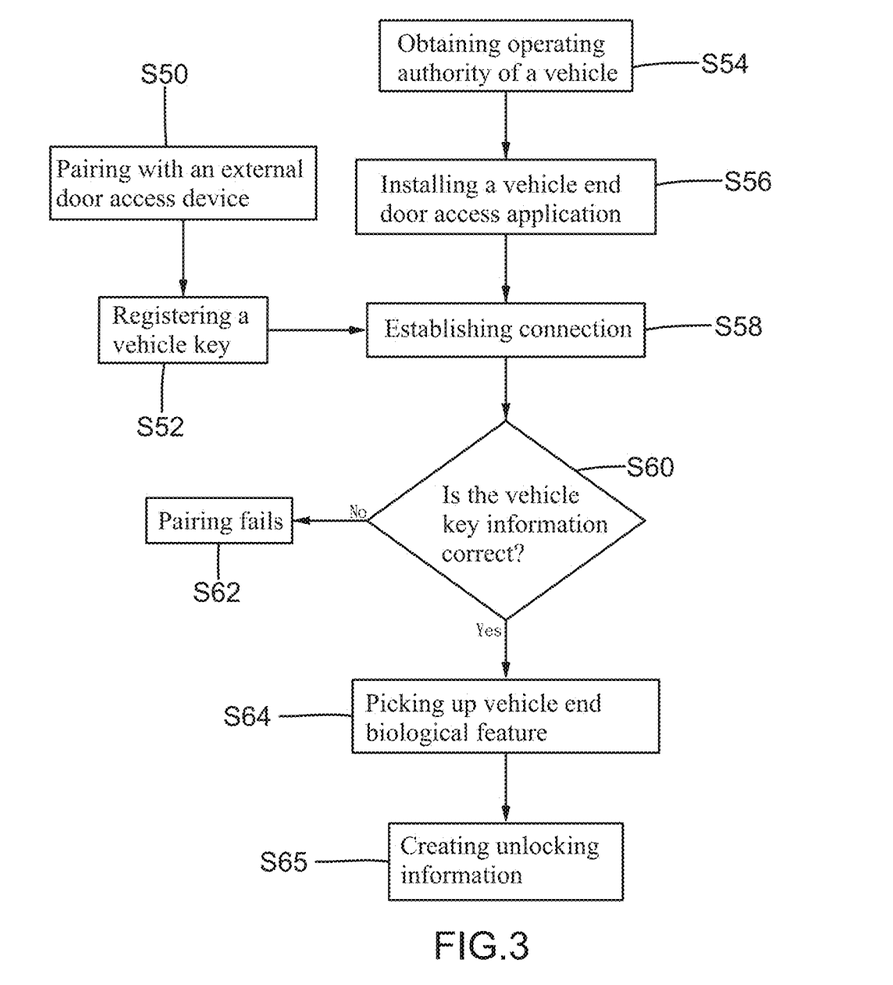
FIG. 3 is a flowchart illustrating another portion of an example of the vehicle door access control method according to the present invention.

After the mobile end door access application of the smart mobile device 36 creates the management information, the smart mobile device 36 obtains the management authority of the external door access device 34. Namely, the smart mobile device 36 is permitted to unlock or open the external door access device 34 after pairing with the external door access device 34. The smart mobile device 36 may also authorize the function of unlocking or opening of the external door access device 34 to another device, such as the vehicle host 20 or another smart mobile device. It is noted that "paring with an external door access device" (step S50)

in FIG. 3 indicates all steps of pairing between the smart mobile device 36 and the external door access device 34 in FIG. 1.

With reference to FIG. 3, after the smart mobile device 36 has successfully paired with the external door access device 34, the smart mobile device 36 is permitted to authorize the unlocking authority of the external door access device 34 to the vehicle host 20. Specifically, a person can use the vehicle key 32 to unlock the vehicle 20, such that the person can open the vehicle end door access device 26 to thereby enter the vehicle 20 for obtaining operating authority of the vehicle host 22 (step S54). In this state, the vehicle host 22 can download and install a vehicle end door access application (APP) (step S56). Thus, the vehicle host 22 can run the vehicle end door access application.

A vehicle key information associated with the vehicle key 32 is registered in the smart mobile device 36 (step S52). For example, after obtaining agreement, license, and/or technical support from the manufacturer of the vehicle 20, the smart mobile device 36 is permitted to read the vehicle key information stored in the vehicle key 32. For example, in a case that the vehicle key 32 has a Bluetooth function, the smart mobile device 36 executing the mobile end biological feature can create connection with the vehicle key 32 with Bluetooth technique, and the smart mobile device 36 can then read the vehicle key information of the vehicle key 32. The mobile end door access application registers the vehicle key information.

It is noted that while the mobile end door access application is registering the vehicle key information of the vehicle key 32, the mobile end door access application may but not limited to request the holder of the smart mobile device 36 to instantly input a mobile end biological feature (such as a facial feature). When the mobile end door access application identifies that the inputted mobile end biological feature matches with the mobile end authentication biological feature stored in the management information, the mobile end door access application executes procedures regarding registration of the vehicle key information of the vehicle key 32.

After the mobile end door access application registers the vehicle key information of the vehicle key 32, the vehicle host 22 runs the vehicle end door access application, whereas the smart mobile device 36 runs the mobile end door access application, thereby connecting the smart mobile device 36 with vehicle host 22 (step S58). After the vehicle host 22 is connected with the smart mobile device 36, the vehicle host 22 compares the vehicle key information registered in the smart mobile device 36 with the vehicle key information of the vehicle 22 (step S60). When the vehicle key information registered in the smart mobile device 36 does not match with the key information of the vehicle 22, both the vehicle end door access application and the mobile end door access application identify the pairing fails (step S62). Thus, the vehicle host 22 cannot obtain the unlocking authority of the external door access device 34.

When the vehicle key information registered in the smart mobile device 36 matches with the key information of the vehicle 22, both the vehicle end door access application and the mobile end door access application identify the pairing is successful, the vehicle end door access application picks up a vehicle end authentication biological feature of a person in the vehicle 20 (step S64), and the vehicle end biological feature can be used by the smart mobile device 36 to create an unlocking information (step S65). The unlocking information enables the vehicle host 22 to obtain the unlocking authority of the external door access device 34.

Regarding creation of the unlocking information (step S65), in a non-restrictive example, the vehicle end biological feature pick-up device 24 picks up a vehicle end authentication biological feature of a person on the driver's seat in the vehicle 20 (step S64), and the smart mobile device 36 obtains the hardware identification information of the external door access device 34. Furthermore, the vehicle end door access application encrypts the vehicle end authentication biological feature and the hardware identification of the external door access device 34 (obtained by the smart mobile device 36) together as an unlocking information (step S65). The unlocking information is stored in the vehicle host 22. Therefore, the vehicle host 22 obtains the unlocking authority of the external door access device 34.

In a non-restrictive example, when the smart mobile device 36 is to be connected with the vehicle host 22, the mobile end door access application may request the holder of the smart mobile device 36 to instantly input a to-be-compared mobile end biological feature (such as a facial feature). When the instantly inputted to-be-compared mobile end biological feature matches with the mobile end authentication biological feature stored in the management information, the smart mobile device 36 is connected with the vehicle host 22. On the other hand, when the instantly inputted to-be-compared mobile end biological feature does not match with the mobile end authentication biological feature stored in the management information, the smart mobile device 36 is not connected with the vehicle host 22.

Figure 4:
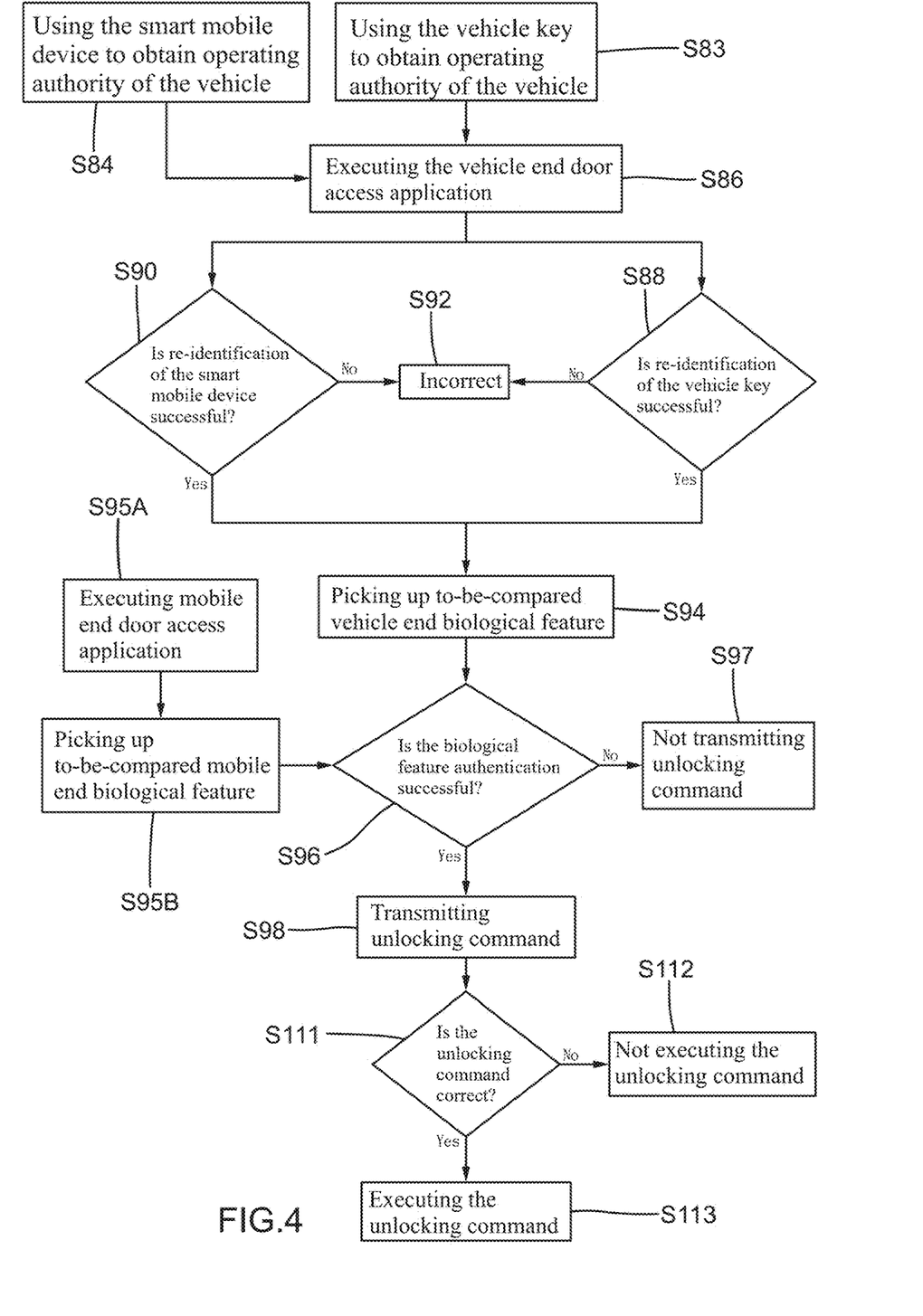
FIG. 4 is a flowchart illustrating a further portion of an example of the vehicle door access control method according to the present invention.

With reference to FIG. 4, assuming the smart mobile device 36 executes the mobile end door access application to unlock or open the external door access device 34 (step S95A), the mobile end door access application uses a biological feature pick-up device (such as a front lens for picking up facial feature or a fingerprint pick-up device for picking up fingerprints) of the smart mobile device 36 to instantly pick up a to-be-compared mobile end biological feature of the holder of the smart mobile device 36 (step S95B). In step S96, it is identified whether the biological feature authentication successful. When the instantly pick-up to-be-compared mobile end biological feature does not match with the mobile end authentication biological feature stored in the management information, the smart mobile device 36 does not transmit an unlocking command, and the external door access device 34 remains locked or does not open (step S97).

When the instantly pick-up to-be-compared mobile end biological feature matches with the mobile end authentication biological feature stored in the management information, the smart mobile device 36 transmit an unlocking command. For example, the mobile end door access application uses a wireless signal unit (such as a Bluetooth unit) of the smart mobile device 36 to transmit an unlocking command containing the hardware identification information to the external door access device 34.

When the external door access device 34 receives the unlocking command from the smart mobile device 36, the external door access device 34 identifies whether the unlocking command is correct (step S111). When the unlocking command from the smart mobile device 36 is identified as being incorrect, the external door access device 34 does not execute the unlocking command (step S112), such that the external door access device 34 remains locked or does not open. On the other hand, when the unlocking command from the smart mobile device 36 is identified as being correct, the external door access device 34 executes the unlocking command (step S113), such that the external door access device 34 is unlocked or opened.

For example, when the external door access device 34 identifies that the hardware identification information contained in the unlocking command does not match with the hardware identification information of the external door access device 34, the external door access device 34 does not execute the unlocking command and, thus, 34 remains locked or does not open (step S112). On the other hand, when the external door access device 34 identifies that the hardware identification information contained in the unlocking command matches with the hardware identification information of the external door access device 34, the external door access device 34 executes the unlocking command and, thus, is unlocked or opened (step S113).

Assuming a person uses the vehicle key 32 to unlock the vehicle 20 and enters the vehicle to thereby obtain operating authority of the vehicle 20 (step S83), the person can further use the vehicle host 22 to execute the mobile end door access application (step S86). The vehicle host 22 will re-identify whether the vehicle key 32 is correct (step S88). For example, in a case that the vehicle 20 is used outside and unlocked by a vehicle key 32 and then driven back to a place in front of a garage of the house, and an electric rolling door of the garage is closed, the driver of the vehicle can operate the vehicle end display 28 to execute the vehicle end door access application, such that the vehicle host 22 re-identify whether the vehicle key 32 is correct.

When the vehicle key 32 is identified as being incorrect after re-identification, the vehicle end door access application does not execute the following steps, and the external door access device 34 remains locked or does not open. On the other hand, when the vehicle key 32 is identified as being correct, the vehicle end door access application uses the vehicle end biological feature pick-up device 24 through the vehicle host 22 to instantly pick up a to-be-compared vehicle end biological feature of the person on the driver's seat (step S94). In step S96, the to-be-compared vehicle end biological feature is compared with the vehicle end authentication biological feature. When the to-be-compared vehicle end biological feature does not match with the vehicle end authentication biological feature, the vehicle host 22 does not transmit an unlocking command (step S97). When the to-be-compared vehicle end biological feature matches with the vehicle end authentication biological feature, the vehicle host 22 transmits an unlocking command to the external door access device 34 (step S98).

In a case that the external door access device 34 receives another unlocking command from the vehicle 20, when the external door access device 34 identifies that the unlocking command from the vehicle 20 is incorrect (the hardware identification information contained in the unlocking command from the vehicle 20 does not match with the hardware identification information of the external door access device 34), the external door access device 34 does not execute the unlocking command, and the external door access device 34 remains locked or does not open (step S112). On the other hand, when the external door access device 34 identifies that the unlocking command from the vehicle 20 is correct (the hardware identification information contained in the unlocking command from the vehicle 20 matches with the hardware identification information of the external door access device 34), the external door access device 34 executes the unlocking command, and the external door access device 34 is unlocked or opened (step S113).

Assuming a person uses the smart mobile device 36 to unlock and enter the vehicle 20 and obtains the operating authority of the vehicle 20 (step S83), the person can use the vehicle host 22 to execute the vehicle end door access application (step S86). The vehicle host 20 will re-identify whether the smart mobile device 36 has been paired (step S90). For example, the vehicle 20 is connected with the smart mobile device 36 through Bluetooth technique, and the vehicle 20 reads the vehicle key information stored in the smart mobile device 36. The vehicle 20 identifies whether the smart mobile device 36 has been paired by identifying whether the vehicle key information stored in the smart mobile device 36 is correct. In another approach, while the vehicle host 22 is connected with the smart mobile device 36, the vehicle end door access application sends out two sets of encrypted codes through the vehicle host 22 to the smart mobile device 36, and the mobile end door access application uses the two sets of encrypted codes to compare with another two sets of codes generated by the mobile end door access application, thereby identifying whether the smart mobile device 36 has been paired.

When the smart mobile device 36 has not been paired and is, thus, identified as being incorrect, the vehicle end door access application does not execute the following steps, and the external door access device 34 remains locked or does not open (step S92). On the other hand, when the smart mobile device 36 is identified as having been paired, the vehicle end biological feature pick-up device 24 will pick up a to-be-compared vehicle end biological feature (such as the facial feature) of the person on the driver's seat (step S94). When the to-be-compared vehicle end biological feature does not match with the vehicle end authentication biological feature stored in the unlocking information, the vehicle host 22 does not transmit the unlocking command to the external door access device 34 (step S97). On the other hand, when the to-be-compared vehicle end biological feature matches with the vehicle end authentication biological feature stored in the unlocking information, the vehicle host 22 transmits the unlocking command to the external door access device 34 (step S98).

In a case that the external door access device 34 receives another unlocking command from the vehicle 20, when the external door access device 34 identifies that the unlocking command from the vehicle 20 is incorrect (the hardware identification information contained in the unlocking command from the vehicle 20 does not match with the hardware identification information of the external door access device 34), the external door access device 34 does not execute the unlocking command, and the external door access device 34 remains locked or does not open (step S112). On the other hand, when the external door access device 34 identifies that the unlocking command from the vehicle 20 is correct (the hardware identification information contained in the unlocking command from the vehicle 20 matches with the hardware identification information of the external door access device 34), the external door access device 34 executes the unlocking command, and the external door access device 34 is unlocked or opened (step S113).

The technical features of the present invention has been set forth, and it can be appreciated that the vehicle door access control method according to the present invention may include at least the following advantages. Firstly, the driver of the vehicle 20 can directly unlock or open the external door access device 34 (such as unlocking an electronic door lock or opening an electric rolling door) outside the vehicle 20 through the vehicle host 22. When the user intends to drive the vehicle 20 through the door access control, it is not necessary to find a key, a remote control, or a smart mobile device for controlling the external door access device 34, providing enhanced convenience.

When the vehicle key 32 is used to obtain the operating authority of the vehicle 20 and the vehicle host 22 is used to execute the vehicle end door access application, the vehicle 20 will confirm again whether the vehicle key 32 is correct. The to-be-compared vehicle end biological feature of the driver will be picked up only when the vehicle key 32 is identified as being correct. This enhances the safety of executing unlocking or opening of the external door access device 34 through operation of the vehicle host 22.

When the smart mobile device 36 is used to obtain the operating authority of the vehicle 20 and the vehicle host 22 is used to execute the vehicle end door access application, the vehicle 20 will confirm again whether the smart mobile device 36 has been paired. The to-be-compared vehicle end biological feature of the driver will be picked up only when the smart mobile device 36 is identified as having been paired. This enhances the safety of executing unlocking or opening of the external door access device 34 through operation of the vehicle host 22.

The unlocking information created by the vehicle 20 requires verification of whether the vehicle key information stored in the smart mobile device 36 is correct. Even if the smart mobile device 36 is lost, a person picking up the smart mobile device 36 is difficult to use the smart mobile device 36 to create the unlocking information of the vehicle 20, providing enhanced safety.

Now that the basic teachings of the present invention have been explained, many extensions and variations will be obvious to one having ordinary skill in the art. For example, the vehicle door access control method according to the present invention according to the present invention is not limited to application on electric rolling doors and electric gates. The vehicle door access control method according to the present invention may also be used to control electronic door locks or other electronic locks. Furthermore, when the vehicle host 22 is executing the vehicle end door access application, confirmation of whether the smart mobile device 36 has been paired or confirmation of whether the vehicle key 32 is correct may be excluded, and the to-be-compared vehicle end biological feature of the driver is directly picked up. In this case, the to-be-compared vehicle end biological feature and the hardware identification information of the external door access device 34 can still be used to control unlocking or opening of the external door access device 34.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A vehicle door access control method comprising:
   pairing a smart mobile device with an external door access device to grant unlocking authority of the external door access device to the smart mobile device and to permit the smart mobile device to authorize the unlocking authority to another device;
   granting an operating authority of a vehicle to a vehicle key;
   registering a vehicle key information of the vehicle key into the smart mobile device;
   connecting the smart mobile device with a vehicle host;
   using the vehicle host to identify whether the vehicle key information stored in the smart mobile device is correct, wherein when the vehicle key information stored in the smart mobile device is identified as being incorrect, pairing of the vehicle host and the smart mobile device fails;
   using a vehicle end biological feature pick-up device of the vehicle to pick up a vehicle end authorization biological feature of a to-be-authorized person in the vehicle when the vehicle key information is identified as being correct, and using the vehicle end authentication biological feature to cooperate with the smart mobile device to create an unlocking information associated with the unlocking authority of the external door access device, and the unlocking information is stored in the vehicle host;
   picking up a to-be-compared vehicle end biological feature of a person in the vehicle through the vehicle end biological feature pick-up device;
   comparing the to-be-compared vehicle end biological feature with the vehicle end authentication biological feature of the unlocking information, wherein when the to-be-compared vehicle end biological feature matches with the vehicle end authentication biological feature, the vehicle transmit an unlocking command, and wherein the vehicle does not transmit the unlocking command when the to-be-compared vehicle end biological feature does not match with the vehicle end authentication biological feature; and
   using the external door access device to identify the unlocking command from the vehicle, wherein when the unlocking command is identified as being incorrect, the external door access device remains locked or is not opened, and wherein when the unlocking command is identified as being correct, the external door access device is unlocked or opened.

2. The vehicle door access control method as claimed in claim 1, wherein the vehicle end biological feature pick-up device is a camera, and wherein the biological feature is a facial feature of a person on a driver's seat.

3. The vehicle door access control method as claimed in claim 1, wherein pairing the smart mobile device with the external door access device includes:
   operating the external door access device to enter a setting mode, wherein when connection between the smart mobile device and the external door access device is unsuccessful, the external door access device ends the setting mode, and wherein the smart mobile device obtains a hardware identification information of the external door access device when the smart mobile device is successfully connected with the external door access device; and
   using the smart mobile device to pick up a mobile end authentication biological feature, wherein when picking of the mobile end authentication biological feature is successful, the smart mobile device uses the hardware identification information and the mobile end authentication biological feature to create a management information, such that the smart mobile device is granted with management authority of the external door access device, the smart mobile device is permitted to authorize the unlocking authority of the external door access device to the another device, and the vehicle host obtains the hardware identification information and the mobile end authentication biological feature from the smart mobile device and encrypts the hardware identification information and the mobile end authentication biological feature as the unlocking information, and wherein when picking of the mobile end authentication biological feature is not successful, the smart mobile device does not create the management information.

4. The vehicle door access control method as claimed in claim 1, further comprising:

re-identifying the vehicle key when using the vehicle key to obtain the operating authority of the vehicle and before using the vehicle end biological feature pick-up device to pick up the to-be-compared vehicle end biological feature, wherein when the vehicle key is re-identified by the vehicle host as being correct, the vehicle end biological feature pick-up device picks up the to-be-compared mobile end biological feature, and wherein when the vehicle key is re-identified by the vehicle host as being incorrect, the vehicle end biological feature pick-up device does not pick up the to-be-compared mobile end biological feature; and re-identifying the smart mobile device when using the smart mobile device to obtain the operating authority of the vehicle and before using the vehicle end biological feature pick-up device to pick up the to-be-compared vehicle end biological feature, wherein when the vehicle host reads the vehicle key information from the smart mobile device and identifies the vehicle key information as being correct, the vehicle end biological feature pick-up device picks up the to-be-compared mobile end biological feature, and wherein when the vehicle key information in the smart mobile device is re-identified by the vehicle host as being incorrect, the vehicle end biological feature pick-up device does not pick up the to-be-compared mobile end biological feature.

5. The vehicle door access control method as claimed in claim 3, further comprising:

using the smart mobile device to pick up a to-be-compared mobile end biological feature of a user; and comparing the to-be-compared mobile end biological feature with the mobile end authentication biological feature of the management information, wherein the smart mobile device does not transmit another unlocking command when the to-be-compared mobile end biological feature does not match with the mobile end authentication biological feature, wherein the smart mobile device transmits the another unlocking command when the to-be-compared mobile end biological feature matches with the mobile end authentication biological feature, wherein when the exterior door access device identifies the another unlocking command from the smart mobile device as being correct, the external door access device is unlocked or opened, and wherein when the exterior door access device identifies the another unlocking command from the smart mobile device as being incorrect, the external door access device remains locked or is not opened.

6. The vehicle door access control method as claimed in claim 1, wherein the smart mobile device is used to input a to-be-compared mobile end biological feature before the smart mobile device is connected with the vehicle host, wherein when the to-be-compared mobile end biological feature matches with the mobile end authentication biological feature of the management information, the smart mobile device is connected with the vehicle host, and wherein when the to-be-compared mobile end biological feature does not match with the mobile end authentication biological feature of the management information, the smart mobile device is not connected with the vehicle host.

* * * * *